US009097805B2

(12) United States Patent
Balaji et al.

(10) Patent No.: US 9,097,805 B2
(45) Date of Patent: Aug. 4, 2015

(54) SYSTEMS AND METHODS FOR CALIBRATING DUAL POLARIZATION RADAR SYSTEMS (75) Inventors: Mrinal Singh Balaji, Huntsville, AL (US); John R. Ellis, Decatur, AL (US); R. Darrin Cartwright, Norman, OK (US); William H. Walker, Madison, AL (US)

(73) Assignee: Baron Services, Inc., Huntsville, AL (US)

( * ) Notice: Subject to any disclaimer, the term of this patent is extended or adjusted under 35 U.S.C. 154(b) by 509 days.

(21) Appl. No.: 13/441,419

(22) Filed: Apr. 6, 2012

(65) Prior Publication Data
US 2012/0256785 A1   Oct. 11, 2012

Related U.S. Application Data (60) Provisional application No. 61/472,773, filed on Apr. 7, 2011.

(51) Int. Cl.
*G01S 7/40* (2006.01)
*G01S 7/02* (2006.01)
*G01S 13/95* (2006.01)

(52) U.S. Cl.
CPC ............. *G01S 13/951* (2013.01); *G01S 7/025* (2013.01); *G01S 7/4021* (2013.01)

(58) Field of Classification Search
CPC ...... G01S 13/951; G01S 7/025; G01S 7/4021
USPC ..................... 342/26 R, 26 A–26 D, 188, 174
See application file for complete search history.

(56) References Cited

U.S. PATENT DOCUMENTS 5,500,646 A    3/1996   Zrnic
6,473,026 B1   10/2002  Ali-Mehenni et al.
(Continued)

FOREIGN PATENT DOCUMENTS

EP    2360491 A1 *  8/2011
JP    2011027546 A *  2/2011
WO    2009/114864     9/2009

OTHER PUBLICATIONS

Anagnostou et al. Comparison of Two Raindrop Size Distribution Retrieval Algorithms for X-Band Dual Polarization Observations. American Meteorological Society. Notes and Correspondence. Jun. 8. [Retrieved on Oct. 8, 2012] Retrieved from the Internet: <http://journals.ametsoc.org/doi/pdf/10.1175/2007JHM904.1>. entire document.

(Continued)

*Primary Examiner* — John B Sotomayor
(74) *Attorney, Agent, or Firm* — Maynard Cooper & Gale, PC; Jon E. Holland (57) ABSTRACT A dual polarization radar system is calibrated based on real-time data measurements, such as measured horizontal and vertical reflectivities, $Z_H$ and $Z_V$. In this regard, the radar system analyzes the reflected power measurements to identify which measurements are associated with reflections from a respective spherical object. Using such measurements, the system determines a system differential reflectivity value, and combines such value with reflected power measurements for calibration. Since the calibration is based on real-time data measurements, the calibration process may run simultaneously with the collection of weather data. Further, the calibration process is immune to the weather events within range of the radar system. Accordingly, it is possible for the calibration to be performed at any time and without interfering with the weather monitoring activities regardless of the types of weather events occurring within the vicinity of the radar system.

26 Claims, 7 Drawing Sheets

(56) References Cited

U.S. PATENT DOCUMENTS

| | | | |
|---|---|---|---|
| 7,158,071 B2 * | 1/2007 | Testud et al. ................ 342/25 R |
| 7,242,343 B1 * | 7/2007 | Woodell ...................... 342/26 B |
| 7,417,577 B2 * | 8/2008 | Testud et al. ................ 342/26 R |
| 7,528,767 B2 * | 5/2009 | Walker .......................... 342/174 |
| 7,554,486 B2 | 6/2009 | Walker |
| 7,592,948 B2 * | 9/2009 | Walker .......................... 342/174 |
| 7,898,459 B2 * | 3/2011 | Venkatachalam et al. .. 342/26 R |
| 7,920,089 B2 * | 4/2011 | Walker .......................... 342/174 |
| 8,004,458 B2 * | 8/2011 | Walker .......................... 342/174 |
| 8,188,906 B2 * | 5/2012 | Mizutani et al. ............ 342/26 R |
| 8,325,084 B2 * | 12/2012 | Walker .......................... 342/174 |
| 2007/0103359 A1 * | 5/2007 | Testud et al. ................ 342/26 R |
| 2008/0224919 A1 | 9/2008 | Walker |
| 2008/0224920 A1 * | 9/2008 | Walker .......................... 342/174 |
| 2008/0224921 A1 * | 9/2008 | Walker .......................... 342/174 |
| 2009/0237296 A1 * | 9/2009 | Walker .......................... 342/174 |
| 2009/0284409 A1 * | 11/2009 | Walker .......................... 342/174 |
| 2009/0295627 A1 * | 12/2009 | Venkatachalam et al. .. 342/26 R |
| 2009/0315762 A1 * | 12/2009 | Venkatachalam et al. .. 342/26 R |
| 2011/0018757 A1 * | 1/2011 | Mizutani et al. ............ 342/26 R |
| 2011/0063161 A1 * | 3/2011 | Ishizawa et al. ............... 342/159 |
| 2011/0102250 A1 * | 5/2011 | Venkatachalam et al. .. 342/26 R |
| 2011/0267224 A1 * | 11/2011 | Venkatachalam et al. .. 342/26 R |
| 2012/0007770 A1 * | 1/2012 | Walker .......................... 342/174 |
| 2012/0044105 A1 * | 2/2012 | Bachmann et al. ............ 342/188 |
| 2012/0256785 A1 * | 10/2012 | Balaji et al. .................... 342/174 |
| 2014/0210661 A1 * | 7/2014 | Balaji et al. .................... 342/174 |

OTHER PUBLICATIONS

Gorgucci, et al., "Calibration of Radars Using Polarimetric Techniques," IEEE Transactions on Geoscience and Remote Sensing, IEEE Service Center, Piscataway, NJ, US, vol. 30, No. 5, Sep. 1, 1992, pp. 853-857.

Zurnic, et al., "Correlation Coefficients between Horizontally and Vertically Polarized Returns from Ground Clutter," Cooperative Institute for Mesoscale Meteorological Studies, University of Oklahoma, and NOAA/OAR/National Severe Storms Laboratory, Norman, Oklahoma, pp. 381-394, Mar. 2006.

\* cited by examiner

| Bin | $Z_H$ | $Z_V$ | $\varphi_H$ | $\varphi_V$ | Azimuth Angle | Elevation Angle |
|---|---|---|---|---|---|---|
| 1 | $Z_{H1}$ | $Z_{V1}$ | $\varphi_{H1}$ | $\varphi_{V1}$ | $AA_1$ | $EA_1$ |
| 2 | $Z_{H2}$ | $Z_{V2}$ | $\varphi_{H2}$ | $\varphi_{V2}$ | $AA_1$ | $EA_1$ |
| 3 | $Z_{H3}$ | $Z_{V3}$ | $\varphi_{H3}$ | $\varphi_{V3}$ | $AA_1$ | $EA_1$ |
| 4 | $Z_{H4}$ | $Z_{V4}$ | $\varphi_{H4}$ | $\varphi_{V4}$ | $AA_1$ | $EA_1$ |
| 5 | $Z_{H5}$ | $Z_{V5}$ | $\varphi_{H5}$ | $\varphi_{V5}$ | $AA_1$ | $EA_1$ |
| 1 | $Z_{H6}$ | $Z_{V6}$ | $\varphi_{H6}$ | $\varphi_{V6}$ | $AA_2$ | $EA_1$ |
| 2 | $Z_{H7}$ | $Z_{V7}$ | $\varphi_{H7}$ | $\varphi_{V7}$ | $AA_2$ | $EA_1$ |
| 3 | $Z_{H8}$ | $Z_{V8}$ | $\varphi_{H8}$ | $\varphi_{V8}$ | $AA_2$ | $EA_1$ |
| 4 | $Z_{H9}$ | $Z_{V9}$ | $\varphi_{H9}$ | $\varphi_{V9}$ | $AA_2$ | $EA_1$ |
| 5 | $Z_{H10}$ | $Z_{V10}$ | $\varphi_{H10}$ | $\varphi_{V10}$ | $AA_2$ | $EA_1$ |

SYSTEMS AND METHODS FOR CALIBRATING DUAL POLARIZATION RADAR SYSTEMS

CROSS REFERENCE TO RELATED APPLICATION

This application claims priority to U.S. Provisional Patent Application No. 61/472,773, entitled "Systems and Methods for Calibrating Dual Polarization Radar Systems" and filed on Apr. 7, 2011, which is incorporated herein by reference.

RELATED ART

A dual polarization radar system transmits and measures the reflectivity of at least two waveforms, often a horizontally polarized waveform and a vertically polarized waveform. The difference between the horizontal reflectivity ($Z_H$), which is a measure of the reflected power in the horizontally polarized return, and the vertical reflectivity ($Z_V$), which is a measure of the reflected power in the vertically polarized return, is indicative of the shape of the radar target from which the waveforms are reflected, and this difference, referred to as "differential reflectivity" or "$Z_{DR}$," can be used to discern the type of meteorological scatterer, such as rain, sleet, hail, or snow or non-meteorological scatterers such as birds and insects.

In transmitting pulses and measuring returns, a radar system may introduce error causing inaccuracies in the raw measurement data. To compensate for such error, a system differential reflectivity value is typically determined via a calibration process, and the system differential reflectivity value is subtracted from differential reflectivity measurements thereby providing more accurate results.

The error introduced by the system may drift or change over time, and the calibration process would ideally be performed often. However, many conventional calibration processes cannot be performed while data is being gathered. That is, the normal operation of the radar system must be undesirably suspended in order to perform the calibration process. In addition, many conventional calibration processes are limited in the times that they can be performed such that the calibration process is performed less frequently than might be desired.

As an example, one conventional calibration process takes advantage of the shape of falling raindrops in order to perform calibration. In this regard, a falling raindrop generally has a perfectly round shape when it is viewed from directly underneath due to symmetries in the effects of air resistance as the raindrop falls. The difference between the horizontal and vertical reflectivities of a falling raindrop, when measured directly underneath, is ideally zero since the discernable shape of the raindrop should be perfectly round. Thus, the actual measured reflectivity difference is indicative of the system error.

Unfortunately, for such calibration, the antenna of the radar system must be pointed to the raindrops directly above the antenna during the calibration thereby preventing the radar system from collecting data from geographic regions typically scanned by the system. In addition, to provide optimum results, the measured raindrops should be within a certain size range, and there may a relatively long time between weather events that produce rain of the desired size directly over the radar system. Indeed, in some geographic regions, opportunities to calibrate the radar system may be months apart. During the interim, the calibration process is not usually performed adversely affecting the accuracy of the data collected by the radar system.

In another conventional calibration process, the antenna of a radar system is pointed toward the Sun during certain times of the day. For the calibration process to be successful, the Sun should be at a certain elevation relative to the radar system, and the times at which the calibration process can be run are thus limited. Depending on the weather events and cloud coverage, the Sun may not be viewable from the radar system while it is at the desired elevation thereby preventing the radar system from performing the calibration. In addition, when the calibration is being performed, the radar system is unable to collect data from geographic regions typically scanned by the system.

Thus a heretofore unaddressed need exists for a calibration process for dual polarization radar systems that can be performed more frequently and in the presence of various types of weather. It would be desirable for such a calibration process to allow data collection while the calibration is being performed so that the normal operation of the system does not need to be suspended for the calibration process.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for calibrating dual polarization radar systems. In one exemplary embodiment, a dual polarization radar system is calibrated based on real-time data measurements, such as measured horizontal and vertical reflectivities, $Z_H$ and $Z_V$. In this regard, the radar system analyzes the reflected power measurements to identify which measurements are associated with reflections from spherical objects. For such measurements, the differential reflectivity $Z_{DR}$ is ideally equal to zero, and the differential reflectivity indicated by the identified measurements is attributable to the system's differential reflectivity ($Z_{DR\_System}$). In this regard, for an actual differential reflectivity measurement, the measured differential reflectivity ($Z_{DR}$) can be expressed according to the following equation:

$$Z_{DR} = (Z_H - Z_V) + Z_{DR\_System}.$$

For a perfectly spherical target, ($Z_H-Z_V$) should be equal to zero such that the measured $Z_{DR}$ should be equal to $Z_{DR\_System}$. This radar system induced bias ($Z_{DR\_System}$) should be corrected for in order to provide accurate weather data.

Since the calibration is based on real-time data measurements, the calibration process may run simultaneously with the collection of weather data. Thus, it is unnecessary to suspend weather monitoring activities in order to perform the calibration, and the calibration can be run as often as is desired without interfering with such weather monitoring activities. Further, the calibration process is immune to the weather events within range of the radar system. Specifically, the calibration process can be used when the scatterers constitute, rain, snow, hail, and/or sleet, regardless of the range and size of the scatterers. In fact, returns from a spherical object of any type, even ground clutter returns, can be used for the calibration, and the calibration therefore can be performed in clear weather conditions. Accordingly, it is possible for the calibration to be performed at any time and without interfering with the weather monitoring activities regardless of the types of weather events occurring within the vicinity of the radar system.

Note that there are a variety of techniques that can be employed to identify which measurements are associated with returns from spherical objects. In one exemplary embodiment, the measured two-way phase shift of the horizontally polarized waveform and the vertically polarized waveform is used to discern which measurements are indicative of spherical objects. In this regard, differential propagation phase shift ($\phi_{DP}$) is defined as the difference between the two-way phase angles ($\phi_H$ and $\phi_V$), in degrees, of the radar signals received from horizontally and vertically polarized waveforms at a particular range location. In other words, $\phi_{DP}$ is equal to ($\phi_H - \phi_V$). Practically though, the value of the measured $\phi_{DP}$ will be offset by the system's differential phase ($\phi_{DP\_System}$) leading to the following equation:

$$(\phi_{DP}) = (\phi_H - \phi_V) + (\phi_{DP\_System}).$$

In the case of an oblate target, the phase speed of the horizontally polarized waveform is slowed relative to that of the vertically polarized waveform during interaction leading to a positive ($\phi_H - \phi_V$). In this case, the measured differential phase angle would be greater than $\phi_{DP\_System}$. However, in the case of a spherical target, the phase speed of the horizontally polarized waveform is equal to that of the vertically polarized waveform during interaction leading to a zero value for the differential phase ($\phi_H - \phi_V$). The measured differential phase angle in this case would be exactly equal to $\phi_{DP\_System}$. It can be observed that in the case where the measured differential phase angle is exactly equal to $\phi_{DP\_System}$, the measured $Z_{DR}$ would be equal to $Z_{DR\_System}$. Thus, as will be described in more detail below, measurements having phase shifts satisfying the condition that $\phi_{DP}$ is approximately equal to $\phi_{DP\_System}$ are identified for use in calibrating the radar system 20, and for such measurements, the measured $Z_{DR}$ is approximately equal to $Z_{DR\_System}$. Thus, $Z_{DR\_System}$ is quantified using the identified measurements, and $Z_{DR\_System}$ is then used for calibration.

Figure 1:
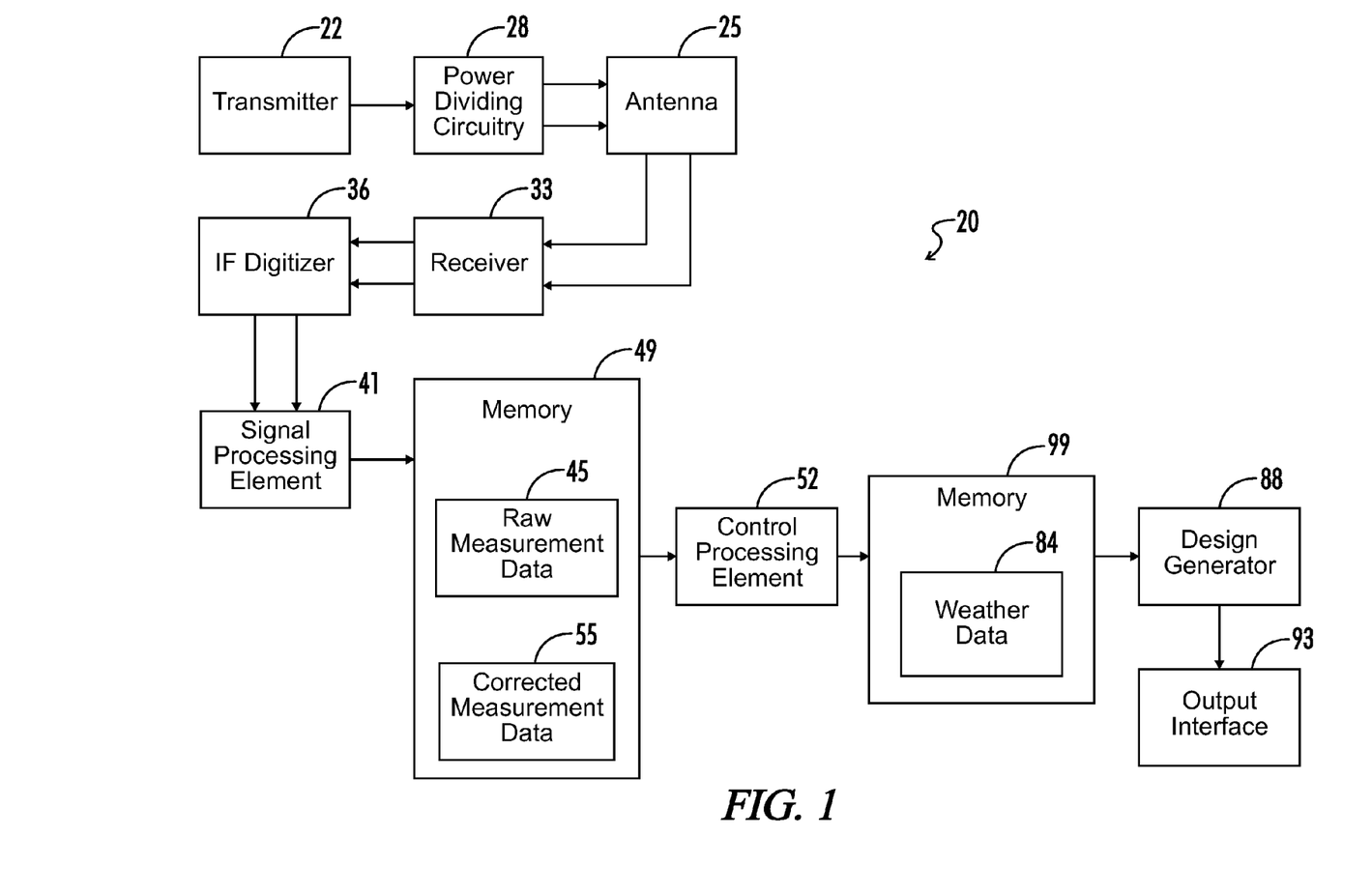
FIG. 1 is a block diagram illustrating an exemplary embodiment of a dual polarization radar system.
Figure 2:
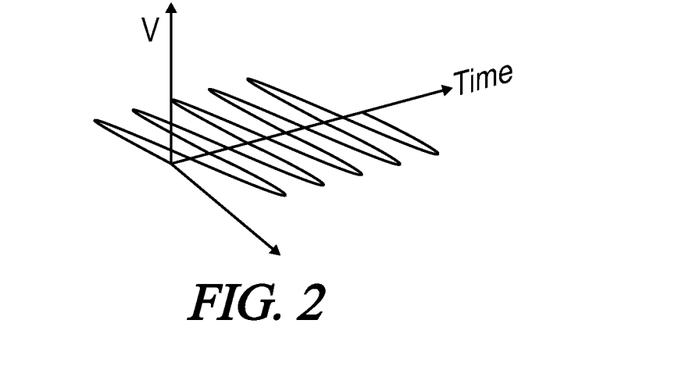
FIG. 2 depicts a graph of electric field versus time for a horizontally polarized waveform transmitted by an antenna of a dual polarization radar system, such as is depicted by FIG. 1.
Figure 3:
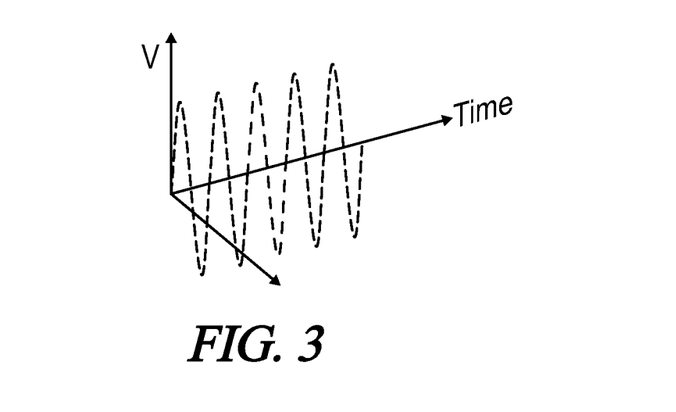
FIG. 3 depicts a graph of electric field versus time for a vertically polarized waveform transmitted by an antenna of a dual polarization radar system, such as is depicted by FIG. 1.
Figure 4:
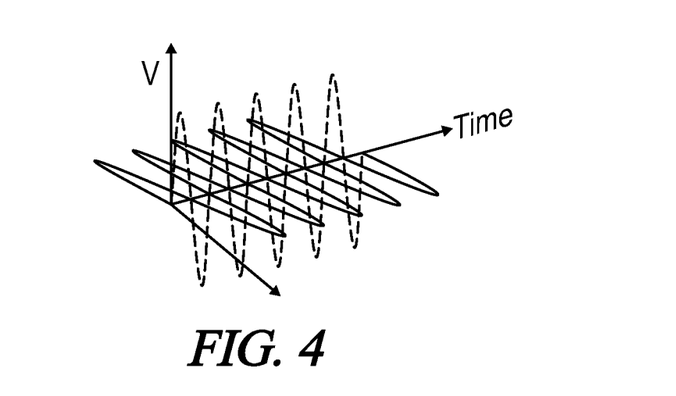
FIG. 4 depicts a graph of electric field versus time for both a vertically polarized waveform and a horizontally polarized waveform transmitted by an antenna of a dual polarization radar system, such as is depicted by FIG. 1.

FIG. 1 depicts an exemplary embodiment of a dual polarization radar system 20. As shown by FIG. 1, the system 20 comprises a transmitter 22 that provides pulses to be wirelessly transmitted from an antenna 25. Each pulse is transmitted by power dividing circuitry 28 that divides the power, thereby providing for each pulse a horizontally polarized waveform and a vertically polarized waveform, both of which are transmitted by the antenna 25. As known in the art, polarization refers to the locus of the tip of the electric field vector observed in a plane orthogonal to the wave normal. FIG. 2 depicts a graph of electric field versus time for a horizontally polarized waveform transmitted by the antenna 25, and FIG. 3 depicts a graph of electric field versus time for a vertically polarized waveform transmitted by the antenna 25. FIG. 4 depicts a graph of electric field versus time for both the vertically polarized waveform and the horizontally polarized waveform transmitted simultaneously.

Ideally, the vertically polarized waveform and the horizontally polarized waveform are transmitted at the same power and thus have the same amplitude. However, practically, there is a slight difference in transmit power causing a slight difference in amplitude, which results in a differential reflectivity bias introduced by the transmit section of the radar system.

For each pulse, energy from the vertically polarized waveform and the horizontally polarized waveform propagates from the antenna 25, reflects from objects, such as terrain, buildings, aerial vehicles, and meteorological scatterers (e.g., rain, hail, sleet, or snow), and returns to the antenna 25. Practically, there is a slight difference in the antenna's directional amplification ability along both the polarizations which results in a differential reflectivity bias introduced by the antenna section of the radar system. A receiver 33 is configured to measure the reflections received by the antenna 25 and to amplify an analog signal indicative of the reflected energy from the vertically polarized waveform and an analog signal indicative of the reflected energy from the horizontally polarized waveform. Practically, there is a slight difference in the receiver amplification chain of components along both the polarizations which results in a differential reflectivity bias introduced by the receive section of the radar system. An intermediate frequency (IF) digitizer 36 is configured to convert each of the analog signals to digital signals, which are received by a signal processing element 41.

The signal processing element 41 is configured to store data 45, referred to herein as "raw measurement data," into memory 49, such as a database or other form of memory. In one exemplary embodiment, the data is separated into bins in which each bin corresponds to a specific geographic region along a particular azimuth and elevation within the range of the system 20, as will be described in more detail below. Note that the signal processing element 41 may be implemented in software, firmware, hardware, or any combination thereof.

Figure 5:
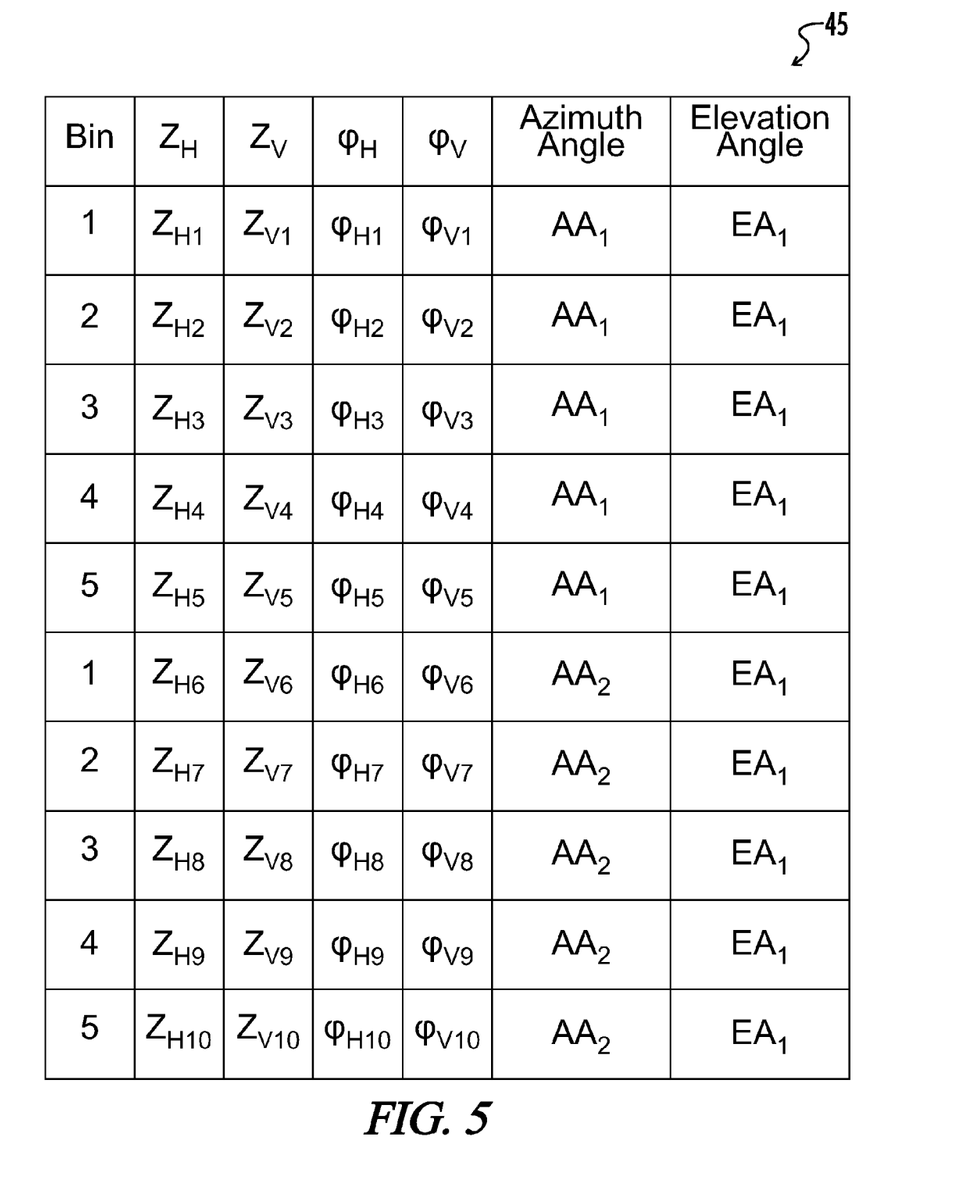
FIG. 5 depicts exemplary raw measurement data collected by a dual polarization radar system, such as is depicted by FIG. 1.

FIG. 5 depicts an exemplary set of raw measurement data 45 for a plurality of bins. As shown by FIG. 5, each bin is associated with a particular azimuth angle (AA) and elevation angle (EA) of the antenna 25. In this regard, the antenna 25 is rotatable in a horizontal direction, which is indicated by the azimuth angle, and the antenna 25 is rotatable in a vertical direction, which is indicated by the elevation angle. The elevation angle and the azimuth angle of the antenna 25 for a particular bin define the direction that the antenna 25 is pointed and, hence, the direction of propagation of the vertically polarized waveform and the horizontally polarized waveform when the measurement for the bin was taken. Further, each bin is also associated with a different time period relative to the time of transmission of the measured vertically and horizontally polarized waveforms from the antenna 25.

As an example, the first five bins (bins 1-5) of FIG. 5 indicate measurements for a particular pulse while the antenna 25 is oriented at the same azimuth angle $AA_1$ and elevation angle $EA_1$. Each such bin 1-5 represents a sample of the pulse at a different time period and thus represents the reflectivity for a different geographic region relative to the other bins. In this regard, assume that a sample for bin 1 occurs a time ($t_1$) after the transmission of a pulse for the sample. The vertical reflectivity ($Z_V$) and horizontal reflectivity ($Z_H$) measured at time $t_1$ are based on returns of the vertically polarized waveform and the horizontally polarized waveform, respectively, from objects within a geographic region that is about a distance $d_1$ from the antenna 25 in the direction indicated by $AA_1$ and $EA_1$, where $d_1$ corresponds to the following equation:

$$d_1 = (v \times t_1)/2,$$

where v is the speed of the vertically and horizontally polarized waveforms through the atmosphere. Note that the values in each bin may be averaged over multiple samples in an effort to provide results that are statistically more accurate. The concept of defining bins of data indicative of measured reflectivity for different geographic regions is generally well-known and will not be described in much greater detail herein. In addition, the parameters shown by FIG. 5 are exemplary, and the raw measurement data 45 may include other types of parameters not specifically disclosed herein. Note that exemplary dual polarization radar systems are described in commonly-assigned U.S. Pat. No. 7,554,486, entitled "System and Method for Dual Polarization Radar with Automatic Built-In Test Equipment and Calibration," and issued on Jun. 30, 2009, which is incorporated herein by reference.

A control processing element 52 is configured to analyze and process the raw measurement data 45 to provide data 55, referred to hereafter as "corrected measurement data," that is free of artifacts unrelated to weather, such as ground clutter. Note that the control processing element 52 may be implemented in hardware, software, firmware, or any combination thereof. In an exemplary embodiment illustrated in FIG. 6, the control processing element 52 is implemented in software and stored in memory 63 of a computer system 66.

The control processing element 52, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

Figure 6:
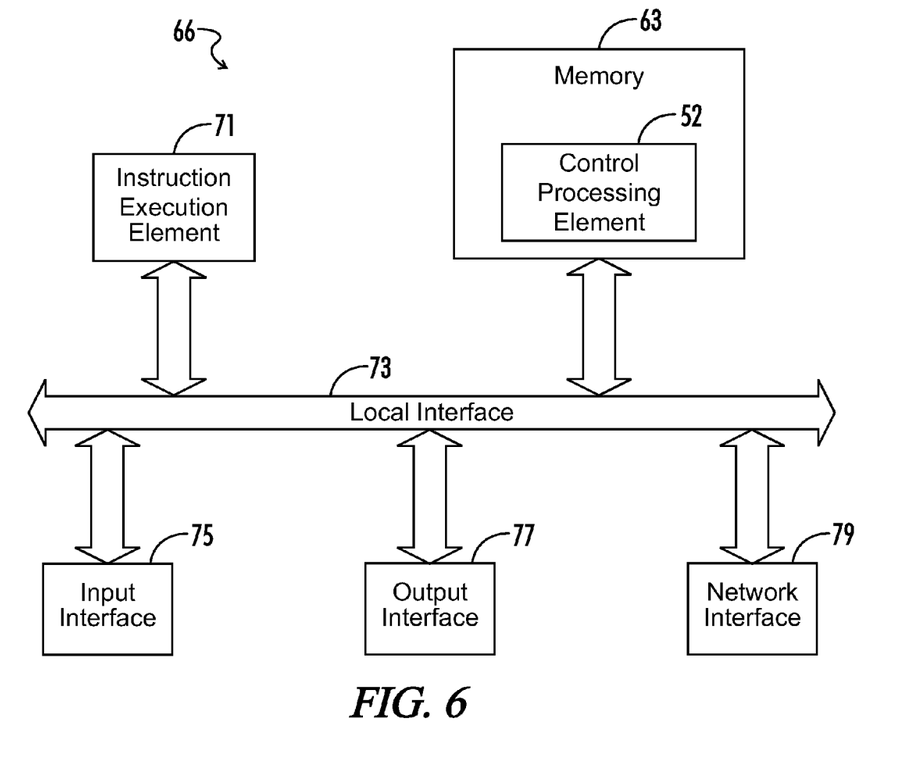
FIG. 6 is a block diagram illustrating an exemplary embodiment of computer system for implementing a signal processing element, such as is depicted by FIG. 1.

The exemplary embodiment of the computer system 66 depicted by FIG. 6 comprises at least one conventional instruction execution apparatus 71, such as a digital signal processor (DSP) or a central processing unit (CPU), that communicates to and drives the other elements within the system 66 via a local interface 73, which can include at least one bus. Furthermore, an input interface 75, for example, a keyboard, keypad, or a mouse, can be used to input data from a user of the system 66, and an output interface 77, for example, a printer or a display device, e.g., a liquid crystal display (LCD), can be used to output data to the user. In addition, a network interface 79, such as a modem, may be used to exchange data with a network (not shown).

To provide the corrected measurement data 45, the control processing element 52 uses various known algorithms to analyze the raw measurement data 45 to determine which bins pertain to returns from objects unrelated to weather, such as buildings, terrain, aerial vehicles, etc. The control processing element 52 filters the raw measurement data 45 to remove the bins determined to be associated with returns from objects unrelated to weather such that the corrected measurement data 55 does not include such bins.

The control processing element 52 is also configured to calculate various parameters that are useful for determining and describing weather events indicated by the corrected and raw measurement data 55 and 45. As an example, for each bin indicated by the corrected measurement data 55, the control processing element 52 calculates differential reflectivity ($Z_{DR\_Corrected}$) according to the equation:

$$Z_{DR\_Corrected} = Z_{DR\_Measured} - Z_{DR\_System},$$

where $Z_{DR\_System}$, as described above, represents the system's differential reflectivity determined via the calibration process described in more detail below. Subtracting $Z_{DR\_System}$ from the measured differential reflectivity $Z_{DR\_Measured}$ effectively removes the differential reflectivity of the system 20 such that $Z_{DR\_Corrected}$ is substantially free of the system's differential reflectivity. That is, $Z_{DR\_Corrected}$ has been calibrated to remove the differential reflectivity introduced by the system 20. The corrected differential reflectivity value ($Z_{DR\_Corrected}$) can be analyzed (e.g., compared to thresholds) to determine the type of meteorological scatterer indicated by the returns for the bin being analyzed. As an example, if $Z_{DR\_Corrected}$ falls within one threshold range, then rain might be indicated, but if $Z_{DR\_Corrected}$ falls in another threshold range, snow might be indicated. Analyzing the corrected measurement data 55 to determine weather information is generally well-known and will not be described in much greater detail herein.

The control processing element 52 is configured to format and otherwise modify the corrected measurement data 55 to provide data 84, referred to hereafter as "weather data," that is compatible with a design generator 88. The weather data 84 is indicative of weather events within the range of the radar system 20. As an example, the weather data 55 may indicate geographic regions affected by rain, hail, snow, sleet, lightning, winds, and other types of weather events, and the weather data 55 may also quantify the extent to which the geographic regions are affected by such events.

The design generator 88 is configured to use the weather data 84 to provide the data 84 in a user-friendly form for display via an output interface 93, such as a printer or a display device. As an example, the design generator 88 may use the weather data 84 to display a radar map that can be viewed to determine the types of weather events occurring within a given geographic region within the vicinity of the radar system 20.

As shown by FIG. 1, the weather data 84 is stored in memory 99, which may be remote from the control processing element 52. As an example, the weather data 99 may be transmitted via a network (not shown) to a central location that collects weather data from multiple radar systems to provide weather information pertaining to a much wider geographic region than what is indicated by the raw measurement data 45.

The control processing element 52 is configured to analyze the raw measurement data 45 and identify which bins are indicative of returns from spherical objects. The control processing element 52 then uses the identified bins to determine $Z_{DR\_System}$ that is used for calibration. Specifically, for each identified bin, it is assumed that any difference between the measured $Z_H$ and $Z_V$ is attributable to the system's differential reflectivity error, and the control processing element 52 calculates $Z_{DR\_System}$ by subtracting the measured $Z_H$ and $Z_V$. The control processing element 52 then creates a histogram of $Z_{DR\_Measured}$ for each of the identified bins; the peak of which will correspond to the system differential reflectivity value ($Z_{DR\_System}$) to be used for calibration. As described above, this system differential reflectivity value is subtracted from each differential reflectivity measurement of the corrected measurement data 55 in order to calibrate the differential reflectivity measurements to make them representative of the weather in the radar's field of view. Specifically, for each bin of the corrected measurement data 55, the control processing element 52 subtracts $Z_{DR\_System}$ from the difference of $Z_H$ and $Z_V$ indicated by the bin in order to remove the estimated system differential reflectivity from the differential reflectivity calculation.

There are various techniques that can be used to identify which of the bins indicate returns from spherical objects. An exemplary process for identifying such bins will be described in more detail below, but it should be emphasized that various changes and modifications to the described process would be apparent to a person of ordinary skill upon reading this disclosure.

Figure 7:
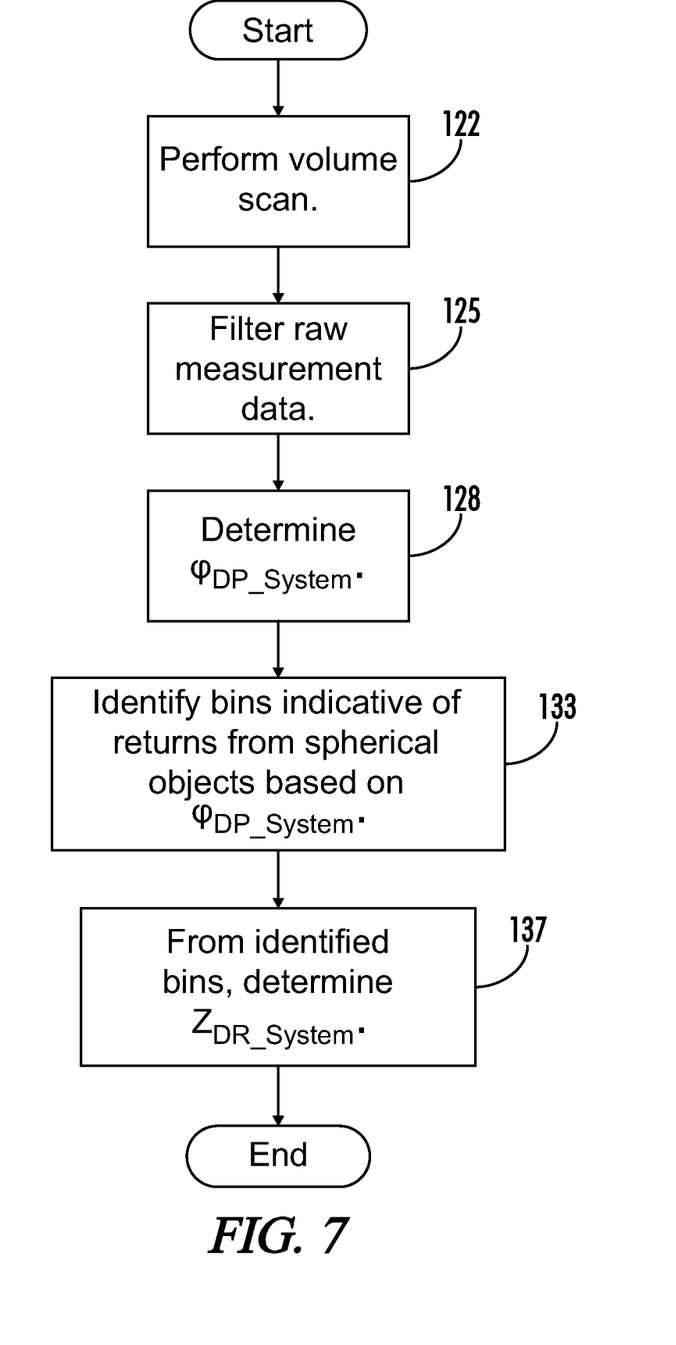
FIG. 7 is a flow chart illustrating an exemplary method for determining a system differential reflectivity value to be used for compensating for system error in a dual polarization radar system, such as is depicted by FIG. 1.

Initially, the radar system 20 performs a volume scan to generate a set of raw measurement data 45, as shown by block 122 of FIG. 7. That is, the radar system 20 collects raw measurement data 45 while the antenna 25 rotates across a range of 360 degrees at a specific elevation angle (e.g., 0.5 degrees). To improve the accuracy of the calibration process, the control processing element 52 filters the raw measurement data 45 to remove bins that are likely erroneous, as shown by block 125 of FIG. 7. In one exemplary embodiment, the control processing element 52 removes bins indicative of returns having a signal-to-noise ratio (SNR) below a threshold, such as 20 decibels (dB). In other embodiments, other techniques for determining which bins to remove are possible.

The control processing element 52 then analyzes the filtered raw measurement data 45 to determine the system differential phase angle ($\phi_{DP\_System}$), as shown by block 128 of FIG. 7. The system differential phase angle refers to the two-way phase angle difference between the horizontally polarized waveform and the vertically polarized waveform. That is, the system differential phase is equal to the difference between the two-way phase angle ($\phi_H$) of the horizontally polarized waveform and the two-way phase angle ($\phi_V$) of the vertically polarized waveform or, in other words, ($\phi_H-\phi_V$). In one exemplary embodiment, techniques described by Zrnic D. S., Melnikov V. M., and Ryzhkov A. V., "Correlation Coefficients between Horizontally and Vertically Polarized Returns," 2005, are used to determine $\phi_{DP\_System}$. In this regard, the control processing element 52 determines the system differential phase angle by plotting a histogram of the differential phase angle values and the peak value of which corresponds to the system differential phase angle ($\phi DP_{\_System}$).

Figure 8:
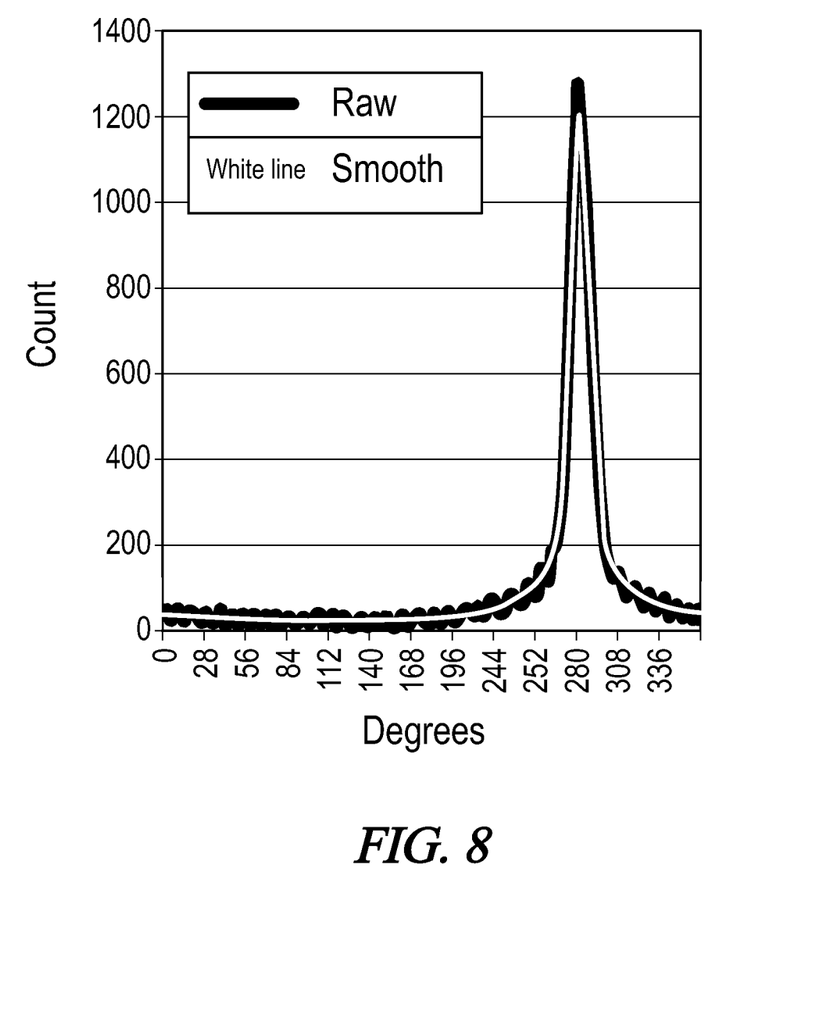
FIG. 8 depicts an exemplary histogram of differential phase values measured by a dual polarization radar system, such as is depicted by FIG. 1.

In this regard, for each bin in the filtered raw measurement data 45, the signal processing element 41 would have determined the bin's differential phase angle value by computing the arc-tangent of the cross-correlation between the horizontally and vertically polarized returns. The control processing element 52 then defines a histogram by plotting, for each differential phase angle value, the number of bins ("count") having such differential phase angle value and smoothing the curve indicated by the plot. An exemplary histogram of the differential phase values is shown by FIG. 8. In the exemplary plot shown by FIG. 8, the peak of the curve occurs at about 280 degrees. Such peak differential phase angle value is the system differential phase angle value ($\phi_{DP\_System}$).

After determining the system differential phase angle, the control processing element 52 again filters the raw measurement data 45, based on $\phi_{DP\_System}$, to identify bins indicative of returns from spherical objects, as shown by block 133 of FIG. 7. As part of the filtering process for one exemplary embodiment, the control processing element 52 identifies bins meeting the following three conditions, referred to hereafter as "filtering conditions": (1) a measured differential phase angle value ($\phi_H-\phi_V$) equal to $\phi_{DP\_System}$; (2) a cross-correlation coefficient at any time lag, $\rho_{HV}$, greater than or equal to a predefined threshold, such as 0.8; and (3) a measured specific differential phase, $K_{DP}$, equal to 0. In other embodiments, other filtering conditions may be specified.

Figure 9:
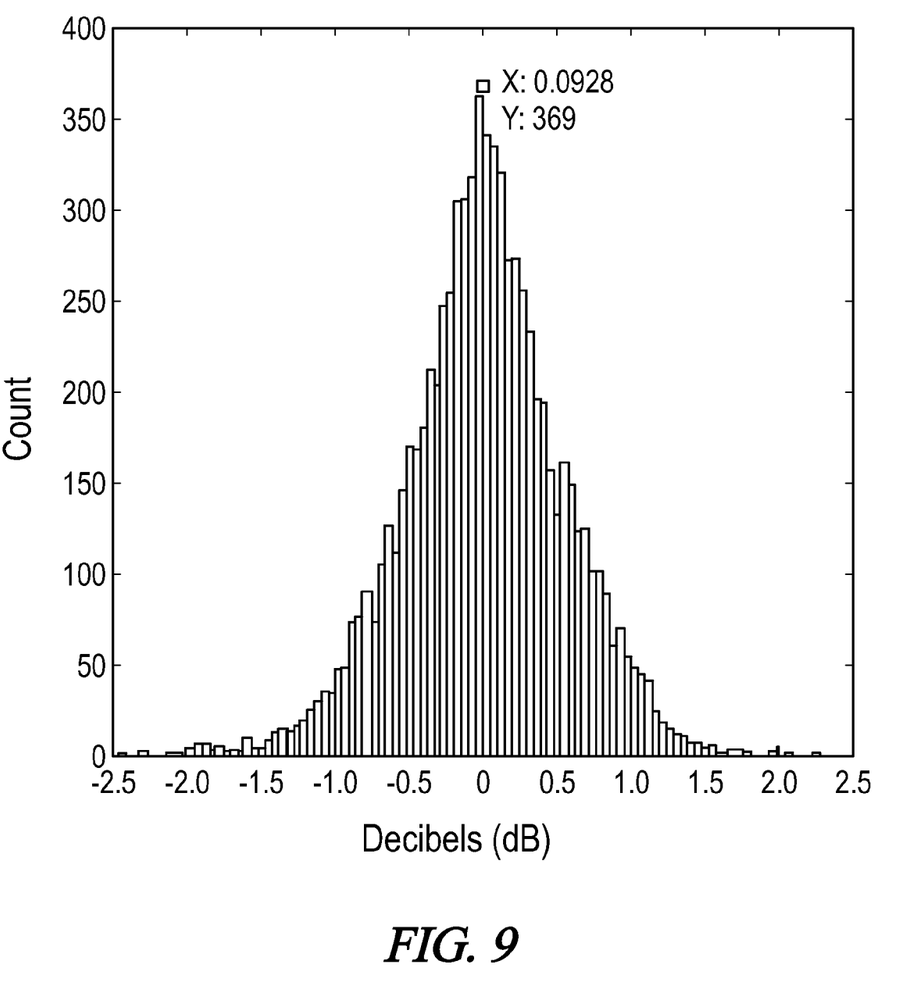
FIG. 9 depicts an exemplary histogram of differential reflectivity values measured by a dual polarization radar system, such as is depicted by FIG. 1.

After identifying the bins indicative of returns from spherical objects for the calibration process, the control processing element 52 determines the system differential reflectivity ($Z_{DR\_System}$) by plotting a histogram of the differential reflectivity values of the identified bins and then selecting the peak value of the histogram to be the system differential reflectivity value ($Z_{DR\_System}$). An exemplary histogram of the differential reflectivity values is shown by FIG. 9. In the exemplary plot shown by FIG. 9, the peak of the curve occurs at about 0.0928. Such peak differential reflectivity value is the system differential reflectivity value ($Z_{DR\_System}$). The corrected measurement data 55 is then calibrated by subtracting the selected system differential reflectivity value ($Z_{DR\_System}$) from the differential reflectivity measurement $Z_{DR\_Measured}$ for each bin. Accordingly, when the corrected measurement data 55 is used to provide the weather data 84, the weather data 84 is likely to more accurately indicate the weather events in the vicinity of the radar system 20.

The invention claimed is:

1. A dual polarization radar system, comprising:
   memory;
   a transmission system configured to wirelessly transmit pulses;
   a receive system configured to receive returns from the transmitted pulses and to store, in the memory, measurement data indicative of the returns, the measurement data defining a plurality of bins comprising reflectivity values indicative of the returns; and
   logic configured to analyze the reflectivity values for identifying which of the bins are indicative of returns from spherical objects, wherein the logic is further configured to calibrate the dual polarization radar system based on the identified bins.

2. The dual polarization radar system of claim 1, wherein the transmission system is configured to transmit the pulses such that each of the pulses comprises a horizontally polarized waveform component and a vertically polarized waveform component.

3. The dual polarization radar system of claim 1, wherein the transmission system is configured to transmit the pulses such that each of the pulses comprises a first waveform component and a second waveform component, and wherein the first and second waveform components have polarization states perpendicular to each other.

4. The dual polarization radar system of claim 3, wherein the logic is configured to calculate, for each of the identified bins, a difference between a reflectivity value for the first waveform component and a reflectivity value for the second waveform component.

5. The dual polarization radar system of claim 1, wherein the logic is configured to determine a system differential reflectivity value based on the identified bins and to combine the system differential reflectivity value with at least one differential reflectivity value measured by the receive system.

6. The dual polarization radar system of claim 5, wherein each of the pulses comprises a first waveform component and a second waveform component, wherein the logic is configured to define a histogram of calculated differences between reflectivity values of the identified bins for the first waveform component and vertical reflectivity values of the identified bins for the second waveform component.

7. The dual polarization radar system of claim 6, wherein the logic is configured to identify a peak of the histogram and to determine the system differential reflectivity value based on the identified peak.

8. The dual polarization radar system of claim 1, wherein the plurality of bins comprise phase angle values for the returns, wherein the logic is configured to determine a system differential phase angle value based on the phase angle values of the plurality of bins, and wherein the logic is configured to identify which of the plurality of bins are indicative of returns from spherical objects based on the system differential phase angle value.

9. The dual polarization radar system of claim 8, wherein the logic is configured to define a histogram of calculated differences between the phase angle values for the returns.

10. The dual polarization radar system of claim 9, wherein the logic is configured to identify a peak of the histogram and to identify which of the plurality of bins are indicative of returns from spherical objects based on the identified peak.

11. A method for use in a dual polarization radar system, comprising:
wirelessly transmitting pulses from the dual polarization radar system;
receiving returns from the transmitted pulses at the dual polarization radar system;
storing, in memory, measurement data indicative of the returns, the measurement data defining bins comprising reflectivity values indicative of the returns;
analyzing the reflectivity values;
identifying a plurality of the bins that are indicative of returns from spherical objects based on the analyzing; and
calibrating the dual polarization radar system based on the identifying.

12. The method of claim 11, wherein each of the pulses comprises a first waveform component and a second waveform component, and wherein the first and second waveform components have polarization states perpendicular to each other.

13. The method of claim 11, wherein each of the pulses comprises a first waveform component and a second waveform component, wherein the method further comprises calculating for at least one of the bins a difference between a reflectivity value for the first waveform component and a reflectivity value for the second waveform component, and wherein the identifying is based on the calculating.

14. The method of claim 11, further comprising determining a system differential reflectivity value based on the identified bins, wherein the calibrating comprises combining the system differential reflectivity value with at least one differential reflectivity value measured by the dual polarization radar system.

15. The method of claim 14, wherein each of the pulses comprises a first waveform component and a second waveform component, and wherein the method further comprises defining a histogram of calculated differences between reflectivity values of the identified bins for the first waveform component and vertical reflectivity values of the identified bins for the second waveform component.

16. The method of claim 15, further comprising identifying a peak of the histogram, wherein the identifying the plurality of the bins is based on the peak.

17. The method of claim 11, wherein the bins defined by the measurement data comprise phase angle values for the returns, wherein the method further comprises determining a system differential phase angle value based on the phase angle values for the returns, and wherein the identifying is based on the system differential phase angle value.

18. The method of claim 17, further comprising defining a histogram of calculated differences between the phase angle values for the returns.

19. The method of claim 18, further comprising identifying a peak of the histogram, wherein the determining is based on the identified peak.

20. A method for use in a dual polarization radar system, comprising:
wirelessly transmitting pulses from the dual polarization radar system;
receiving returns from the transmitted pulses at the dual polarization radar system;
measuring the returns thereby providing a plurality of measurements;
storing, in memory, data indicative of the measurements;
determining, based on the data, whether each of the measurements is indicative of a respective spherical object;
identifying a plurality of the measurements indicative of spherical objects based on the determining; and
calibrating the dual polarization radar system based on the identifying.

21. The method of claim 20, wherein each of the pulses comprises a first waveform component and a second waveform component, and wherein the method further comprises:
calculating, for the identified measurements, differences between reflectivity values for the first waveform component and reflectivity values for the second waveform component; and
determining a system differential reflectivity value based on the calculating,
wherein the calibrating comprises combining the system differential reflectivity value with the at least one differential reflectivity value measured by the dual polarization radar system.

22. The method of claim 20, further comprising determining a system differential reflectivity value based on the identified measurements, wherein the calibrating is based on the system differential reflectivity value.

23. The dual polarization radar system of claim 1, wherein the logic is configured to select a set of the bins for use in calculating a system differential reflectivity value based on which of the bins are identified as indicative of returns from spherical objects, and wherein the logic is configured to calibrate the dual polarization radar system based on the system differential reflectivity value.

24. The dual polarization radar system of claim 1, wherein the logic is configured to select a set of the bins for use in calibration process based on which of the bins are identified as indicative of returns from spherical objects.

25. The method of claim 11, further comprising selecting a set of the bins for use in the calibrating based on which of the bins are identified as indicative of returns from spherical objects.

26. The method of claim 25, further comprising determining a system differential reflectivity value based on the selected set of bins, wherein the calibrating is based on the system differential reflectivity value.

* * * * *